(12) United States Patent
Banholzer et al.

(10) Patent No.: US 7,152,477 B2
(45) Date of Patent: Dec. 26, 2006

(54) PRESSURE SENSOR

(75) Inventors: Karl-Heinz Banholzer, Hausen (DE); Bernhard Gerdes, Binzen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/481,881

(22) PCT Filed: Jul. 18, 2002

(86) PCT No.: PCT/EP02/07976
§ 371 (c)(1),
(2), (4) Date: Sep. 29, 2004

(87) PCT Pub. No.: WO03/014688
PCT Pub. Date: Feb. 20, 2003

(65) Prior Publication Data
US 2005/0056097 A1 Mar. 17, 2005

(30) Foreign Application Priority Data
Jul. 20, 2001 (DE) ................. 101 35 568

(51) Int. Cl.
*G01L 7/00* (2006.01)
(52) U.S. Cl. .............. 73/700; 73/753; 73/756
(58) Field of Classification Search .......... 73/700–756; 361/283.1–283.4
See application file for complete search history.

(56) References Cited
U.S. PATENT DOCUMENTS 4,127,840 A 11/1978 House
4,726,233 A 2/1988 Eckardt et al.
4,809,555 A * 3/1989 Kunz ........................ 73/727
5,022,270 A 6/1991 Rud, Jr.
5,051,937 A 9/1991 Kawate et al.
5,691,479 A * 11/1997 Krisch et al. ................ 73/756
6,508,130 B1 * 1/2003 Werner et al. ............... 73/756
6,615,665 B1 9/2003 Flögel et al.
6,752,021 B1 * 6/2004 Burczyk et al. .............. 73/717
6,848,318 B1 * 2/2005 Gerst et al. ................. 73/715

FOREIGN PATENT DOCUMENTS

EP 0 570 624 A2 11/1993
EP 0 570 624 A3 11/1993
EP 1 106 982 A1 6/2001

OTHER PUBLICATIONS

Patent Abstracts of Japan, vol. 1999, No. 08, Jun. 30, 1999 & JP 11 072400 (Matsushita Electric Works, Ltd.).
Patent Abstracts of Japan, vol. 1995, No. 11, Dec. 26, 1995 & JP 07 198515 (Omron Corp.).

* cited by examiner

*Primary Examiner*—Edward Lefkowitz
*Assistant Examiner*—Jermaine Jenkins
(74) *Attorney, Agent, or Firm*—Bacon & Thomas

(57) ABSTRACT

A pressure sensor having a measuring cell (1) and sensor electronics (13) connected with the measuring cell (1), wherein the sensor electronics (13) and its electrical connections are protected from external influences, wherein on front side of the measuring cell (1) a pressure sensitive element is arranged, on which a pressure (p) acts during operation, and wherein the sensor electronics is arranged on a rear side of the measuring cell (1). The sensor has connected with the measuring cell (1) a cap (19, 27), which encloses the sensor electronics (13), and at least one bushing (25), through which the connection lines (17) connected to the sensor electronics (13) pass.

9 Claims, 3 Drawing Sheets

PRESSURE SENSOR

TECHNICAL FIELD

The invention relates to a pressure sensor.

BACKGROUND OF THE INVENTION

In the technology of pressure measurement, absolute and relative pressure sensors are among the sensors which are used. In the case of absolute pressure sensors, a pressure to be measured is registered absolutely, i.e. as a pressure difference relative to a vacuum. With a relative pressure sensor, a pressure to be measured is recorded in the form of a pressure difference relative to a reference pressure. The reference pressure is an ambient pressure existing where the sensor is located. In most applications, this is the atmospheric pressure at the site where the sensor is being used.

Pressure measuring devices are applied in a multitude of industrial branches, e.g. in chemistry and in the foods industry. In these industries, one frequently finds large plants, in which pressures are to be measured at pluralities of locations for following, controlling, regulating and/or automating processes running in the plants. For this, a multitude of pressure sensors can be used, for instance sensors for various measurement ranges.

Pressure measuring devices are frequently exposed to moisture. This is e.g. the case, when they are used in locations with lasting high air humidity, e.g. in the tropics, when, in the foods industry, containers are cleaned with hot water and subsequently rinsed with cold water, or when the pressure of a cold medium is to be measured and condensate forms because of a higher surrounding temperature.

Pressure sensors usually have a measuring cell and sensor electronics connected with the measuring cell. The measuring cell includes an electromechanical transducer, which converts a reaction of a pressure sensitive element into an electrical signal, which is brought into the sensor electronics where it is available for further evaluation and/or processing. The sensor electronics must, consequently, be accessible for a connection of the same e.g. to an instrument electronics or a supply and/or signal evaluation unit. Exactly the sensor electronics and its electrical connections are, however, especially sensitive to moisture and mechanical loads.

SUMMARY OF THE INVENTION

It is an object of the invention to provide a pressure sensor having a measuring cell and sensor electronics connected therewith, wherein the sensor electronics and the electrical connections thereof are protected against external influences.

To this end, the invention comprises a pressure sensor having a measuring cell,
a pressure sensitive element arranged on a front side of the measuring cell, on which element a pressure to be measured acts during operation,
a sensor electronics arranged at a rear side of the measuring cell, and
a cap connected with the measuring cell,
which encloses the sensor electronics, and
which exhibits at least one bushing,
through which pass the electrical lines connected to the sensor electronics.

The sensor electronics arranged at a rear side of the measuring cell can be positioned in various ways. On the one hand, the sensor electronics can be mounted directly on a rear side of the measurement cell, and, on the other hand, it can be displaced away from the rear side. For the displaced mounting, the sensor electronics can, for example, be secured to a suitable spacer, which is mounted on the rear side of the measuring cell. Such a spacer can, among other effects, serve to thermally de-couple the sensor electronics from the measuring cell. Among other possibilities, the spacer can be a circuit board, which extends essentially perpendicularly to the surface of the rear side of the measuring cell.

According to a development of the invention a bushing for a small tube is provided in the cap, and a reference pressure, to which the pressure to be measured is to be referenced, is brought to the measuring cell through the small tube during operation.

According to a first development, the cap is secured with its open end on an outer edge of the rear side of the measuring cell.

According to a second development, the cap is inverted over the measuring cell and connected at its open end with a closed surface portion of a lateral surface leading from the front side to the rear side of the measuring cell.

According to one development, the measuring cell is made of ceramic, the cap is made of metal, and the measuring cell and the cap are hermetically sealed together by means of a seam.

According to one development, the measuring cell is made of aluminum oxide, the cap is made of a nickel-iron-cobalt alloy, and the seam is made of an active braze, or hard solder.

According to another development, the measurement cell is made of ceramic, the cap is made of ceramic, and the measuring cell and the cap are hermetically sealed together by means of a seal of active braze, or hard solder.

The cap offers an effective protection of the measuring cell against moisture and against mechanical and chemical influences from the environment.

BRIEF DESCRIPTION OF THE DRAWINGS

The invention and other advantages will now be explained in greater detail on the basis of the figures of the drawing, using two examples of embodiments. Equivalent or equal elements are provided in the figures with the same reference characters.

DESCRIPTION OF THE PREFERRED EMBODIMENTS

Figure 1:
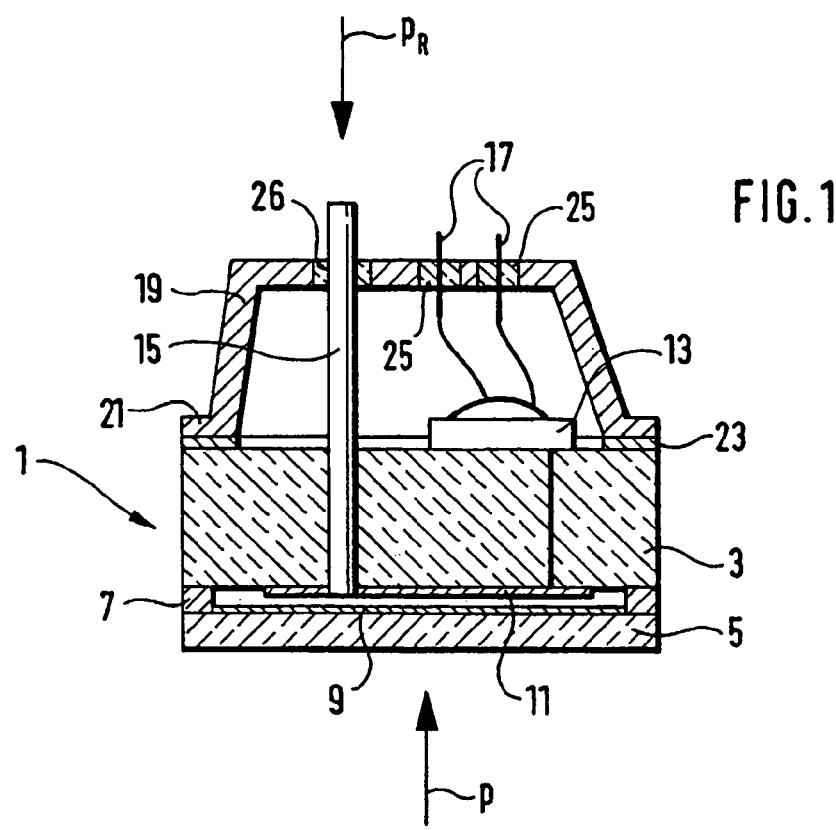
FIG. 1 shows a cross section through a capacitive, ceramic pressure sensor, wherein a cap is provided on the rear side of the measuring cell for enclosing the sensor electronics.

FIG. 1 shows a cross section through a pressure sensor of the invention containing a measuring cell 1. The measuring cell 1 in this embodiment is a relative pressure measuring cell. Arranged on a front side of the measuring cell 1 is a pressure-sensitive element, against which a pressure to be measured acts during operation.

The measuring cell 1 has a platform 3 and a measuring membrane, or diaphragm, 5. The platform 3 is made e.g. of ceramic. The measuring membrane 5 can likewise be made of ceramic or e.g. of sapphire. The measuring membrane 5 and the platform 3 are connected pressure tightly and gas tightly together by means of a seam 7. The measuring membrane 5 forms the pressure-sensitive element. A pressure acting on it causes a deflection of the measuring membrane 5 out of its rest position.

Arranged on an inner side of the measuring membrane 5 is an electrode 9 and on an opposite, inner side of the platform 3 at least one counter electrode 11. The electrode 9 of the measuring membrane 5 is electrically contacted through the seam 7 and connected externally e.g. to ground. The counter electrode 11 of the platform 3 is electrically contacted through platform 3 and is electrically connected to a sensor electronics 13 arranged on the platform 3, on the rear side of the measuring cell. Electrode 9 and counter electrode 11 form a capacitor, and the sensor electronics 13 transforms capacitance changes of the capacitor e.g. into a correspondingly changing electrical voltage.

The platform 3 has a traversing bore, in which is inserted a small tube 15 extending into the measuring chamber. Acting on the inner side of the measuring membrane 5, through tube 15, is e.g. a reference pressure $P_R$ prevailing in the environment of the measuring cell 1.

The pressure to be measured is to be referenced to $P_R$. The pressure $P_R$ is shown symbolically in FIG. 1 by an arrow.

In operation, a pressure p to be measured acts on the outer side of the measuring membrane 5. This pressure also is shown symbolically in FIG. 1 by an arrow.

The pressure p and the reference pressure $P_R$ cause a deflection of the measuring membrane 5 dependent on the relative pressure to be measured. This deflection is registered by the above-described, capacitive, electromechanical transducer and converted by the sensor electronics 13 into an electrical, measured variable. The measured variable is available on connection lines 17 for further processing and/or evaluation.

Instead of the described capacitive, ceramic measuring cell, also e.g. a piezoresistive measuring cell can be used. In these types of measuring cells, the transducer has strain gages mounted on the measuring membrane. The measuring chamber can be formed, also in the case of these measuring cells, by a platform and the measuring membrane itself. The measuring membrane is secured at its outer edge onto the platform.

The pressure sensor has a cap 19 connected securely to the measuring cell. Cap 19 encloses the sensor electronics 13. Cap 19 is pot-shaped and secured at its open end on an outer edge of the rear side of the measuring cell 1. In the embodiment of FIG. 1, cap 19 has on its open end an edge 21 extending radially outwards, parallel to the membrane-far, rear side of the platform 3.

The measuring cell 1 is made of ceramic, preferably of aluminum oxide. The cap 19 is made of a metal. If a measuring cell 1 of aluminum oxide is used, then e.g. nickel-iron-cobalt alloys, such as those obtainable commercially under the product names Vacon or Kovar, are especially suitable materials for the cap 19, since these materials have a coefficient of thermal expansion which is very similar to the coefficient of thermal expansion of aluminum oxide. The measuring cell 1 and the cap 19 are connected together mechanically secure and hermetically sealed by means of a seam 23, preferably of an active braze. Alternatively, the measuring cell 1 and the cap 19 can be connected securely together and sealed e.g. with insertion of a sealing material between them.

The cap 19 has at least one bushing 25, e.g. in the form of glass seals melted into openings in the cap 19, through which the electrical connection lines 17 connected to the sensor electronics 13 extend. Instead of glass seals, other bushings can also be used, e.g. bushings with hard potting compound or collars of other sealing materials. In the embodiment of FIG. 1, two bushings 25 are shown symbolically. Additionally in the embodiment of FIG. 1, a further bushing 26, e.g. likewise a glass seal, is provided for the tube 15 in the cap 19. The reference pressure $P_R$, to which the pressure to be measured, p, is to be referenced, is brought through tube 15 to the measuring cell during operation. Depending on the way the measuring cell is constructed, the tube 15 can, naturally, also be farther from the sensor electronics 13. In that case, tube 15 can be brought along the side of the cap 19. Of course, an extra bushing is not needed in that case.

Naturally, the pressure sensor of the invention can also be formed as an absolute pressure sensor. Then, the measuring chamber of the measuring cell 1 is evacuated, and the bore through the platform 3, the tube 15, and the bushing 26 are not required.

Figure 2:
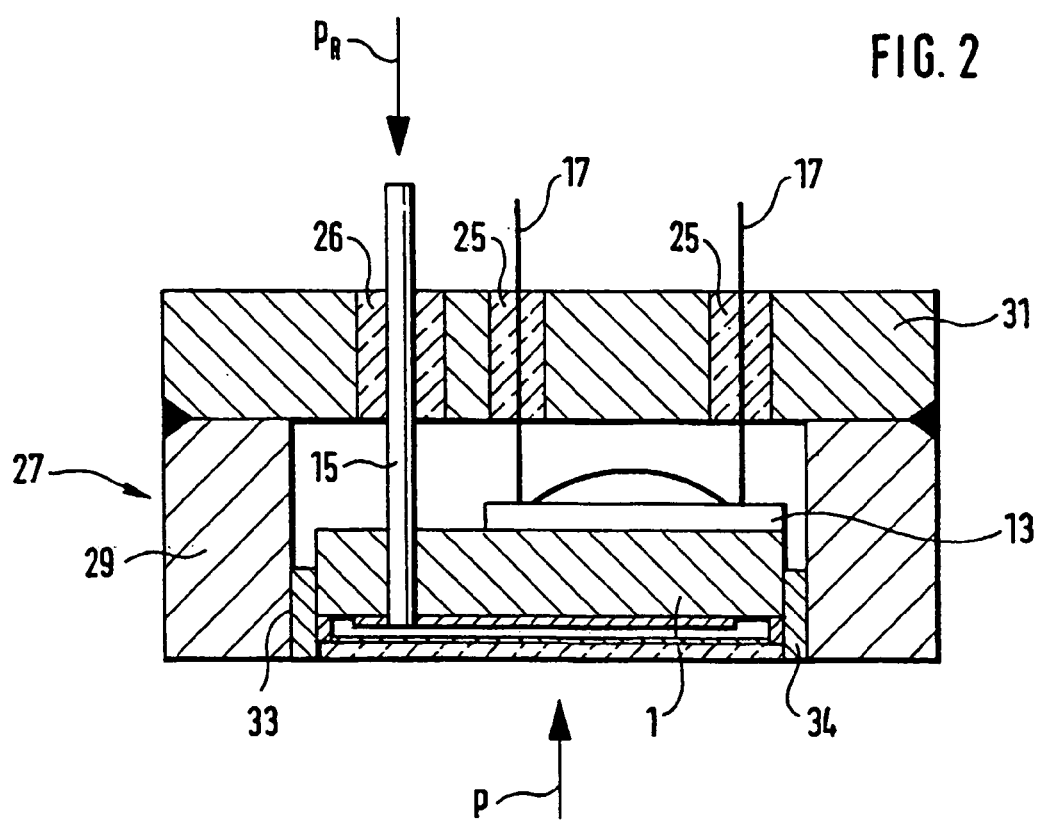
FIG. 2 shows a cross section through a capacitive, ceramic pressure sensor, wherein a cap encloses the measuring cell up to the pressure-sensitive element.

FIG. 2 shows a further embodiment of a pressure sensor of the invention. The measuring cell 1 is identical to the measuring cell 1 shown in FIG. 1.

The embodiment in FIG. 2 also has a cap 27, which encloses the sensor electronics 13. This cap exhibits a cylinder 29 and a disk 31 sealing an end of the cylinder 29. Cap 27 is inverted over the measuring cell 1 and connected at its open end with a closed surface portion 33 of a lateral surface extending from the front side to the rear side of the measuring cell 1.

Disk 31 has three openings in which the bushings 25 for the connection lines 17 and the bushing 26 for the tube 15 are located. The measuring cell 1 in the embodiment of FIG. 2 likewise is made of ceramic, preferably aluminum oxide.

Cap 27 is made of a metal or a ceramic, preferably aluminum oxide. If a measuring cell 1 of an aluminum oxide is used, then e.g. nickel-iron-cobalt alloys, such as e.g. those commercially available with the product names Vacon or Kovar, are especially suitable materials for the cap 27, since these materials have a coefficient of thermal expansion which is very similar to the coefficient of thermal expansion of aluminum oxide. If the cap 27 is of ceramic, then, preferably, the same material is used for cap 27 and measuring cell 1.

The measuring cell 1 and the cap 27 are connected together mechanically secure and hermetically sealed by means of a seam 34, preferably of an active braze.

If the cap 19, 27 is made of a metal, this offers the advantage that, internally in the cap 19, 27, defined electrical conditions are established, which are not changed by installation of the pressure measuring cell. This means that the electrical relationships, such as are established in the calibration of the pressure measuring cell, do not change. For instance, no disadvantageous influences due to stray capacitances arise as a burden to be carried. Additionally, a metallic cap 19, 27 forms essentially a Faraday cage and offers, consequently, a definite protection for the electronic circuit 13 against electromagnetic disturbances.

Figure 3:
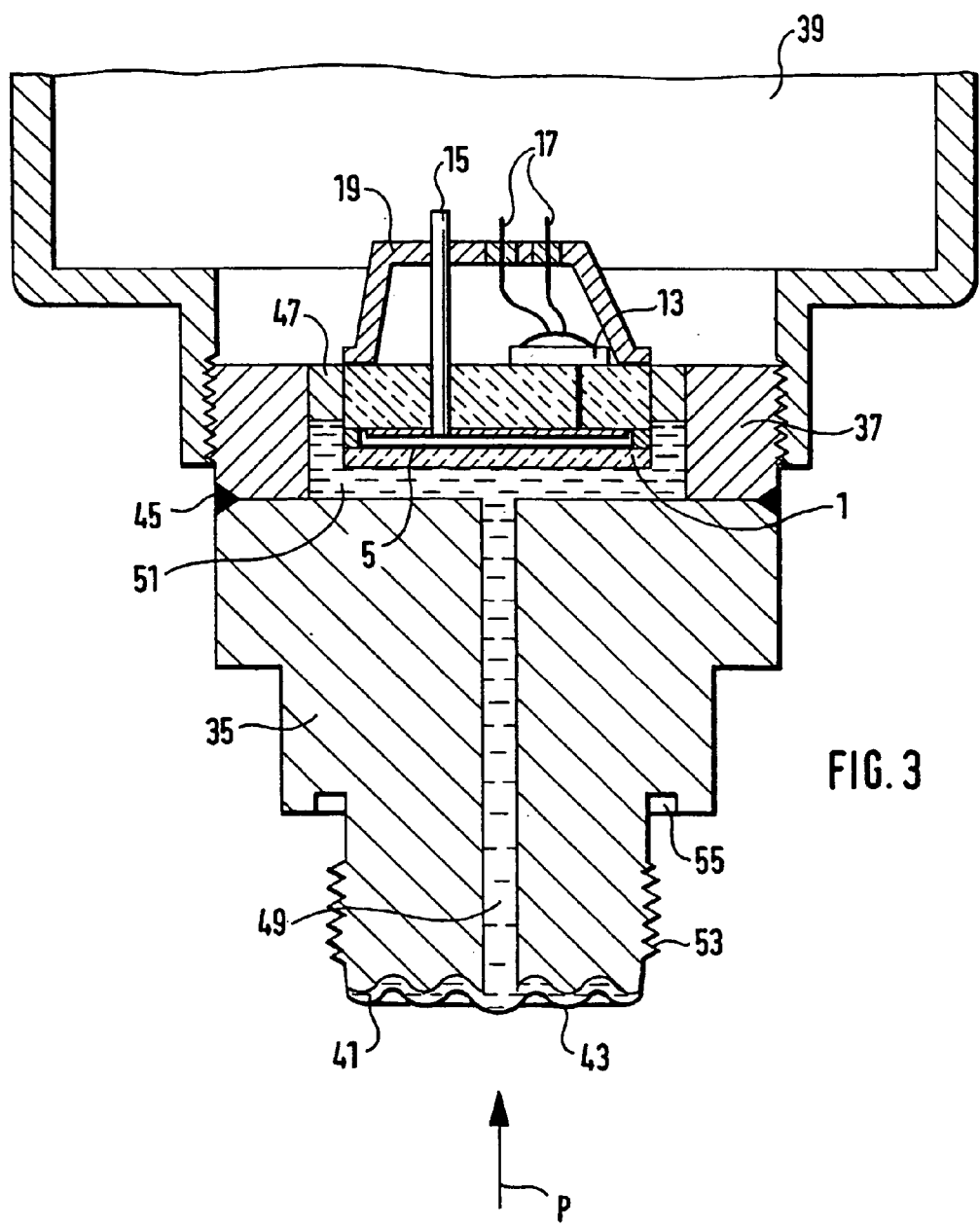
FIG. 3 shows a cross section through a pressure measuring device, in which the pressure measuring cell of FIG. 1 is installed.

FIG. 3 shows an example of a pressure measuring pickup containing a pressure sensor of the invention. The pressure sensor of FIG. 1 is illustrated as an example.

The pressure measuring pickup uses a metallic pressure intermediary 35, for diaphragm-seal pressure transmission, on which border a housing 37 and a connection housing 39 connected to the housing 37.

The pressure intermediary 35 is essentially cylindrical and exhibits on its end a chamber 41 filled with a liquid. Chamber 41 is sealed by a metallic dividing, or separating, membrane 43. Pressure intermediary 35 and dividing membrane 43 are made preferably of a high-grade and corrosion-resistant, stainless steel. In operation, the pressure p to be measured, which is indicated symbolically in FIG. 3 by an arrow, acts against the dividing membrane 43.

The housing 37 is cylindrical and lies with an annularly-shaped base surface on an annularly-shaped, dividing-membrane-far, end surface of the pressure intermediary 35. Housing 37 and pressure intermediary 35 are either a single component or they are connected together by a connection 45 of an inorganic material.

The ceramic measuring cell 1 is arranged secured in the housing 37 by a connection 47 of an inorganic material. In the illustrated embodiment, the ceramic measuring cell 1 and the housing 37 are arranged cylindrically and coaxially with respect to one another, so the housing 37 surrounds the measuring cell 1. The connection 47 is preferably arranged in an annular, cylindrical gap between the housing 37 and the platform 3. In this way, it is achieved that the measuring membrane 5 remains essentially free of clamping stresses.

Housing 37 is made preferably of a material which has a coefficient of thermal expansion approximately equal to the coefficient of thermal expansion of the ceramic of measuring cell 1. If e.g. a measuring cell of aluminum oxide is used, then e.g. nickel-iron-cobalt alloys, such as e.g. those commercially available with the product names Vacon or Kovar, are suitable materials for the housing 37. Alternatively, the housing 37 can, however, likewise be made of a ceramic, e.g. an aluminum oxide. By such a suitable choice of materials, it is achieved that, even in the case of strong temperature fluctuations, only small forces are exerted by the housing 37 on the measuring cell 1.

In the case of a metallic housing 37, the connection between the housing 37 and the pressure pickup 35 can e.g. be a weld, and the connection 47 a seam of e.g. an active braze. In the case of a housing 37 of ceramic, both connections 47 can be metallic seams, e.g. of an active braze.

The pressure intermediary 35 has a traversing bore 49, whose one end opens in the chamber 41 and whose other end opens in a chamber 51 bordering housing 37 and the measuring cell 1. The chamber 41, bore 49 and chamber 51, together with an internal space of the housing 37 towards the front of the measuring cell 1 and facing the pressure intermediary 35, are filled with a liquid which is as incompressible as possible, e.g. a silicone oil.

A pressure p acting on the dividing membrane 43 is transmitted through the liquid to the measuring membrane 5, and a relative-pressure-dependent deflection of the measuring membrane 5 is registered by the above-described capacitive, electromechanical transducer and converted by the sensor electronics 13 into an electrical, measured variable.

In the connection housing 33, a forwarding electronics can e.g. be arranged, which further processes the measured variables made available by the sensor electronics 13 over the connection lines 17 and e.g. yields an output signal desired in a special application. Particularly frequently utilized output signals are e.g. signal currents, whose current strength changes as a function of the real-time measured value or digital signals, which are coupled onto a bus over a bus connection.

The pressure intermediary 35 has on its measuring-cell-far end an external thread 53, by means of which the pressure pickup can be screwed front-flushly into a matching opening at the measurement location. The pressure intermediary 35 thus serves simultaneously as a process connection. Above the external thread 53, the pressure intermediary 35 has an annular resting surface, in which an annular groove 55 is provided for receiving a process seal (not shown in FIG. 3).

The pressure pickup shown in FIG. 3 offers the advantage that all parts coming into contact with a medium whose pressure is to be measured, thus the dividing membrane 43 and all other components coming in contact with a medium whose pressure p is to be measured, here just the external thread 53, are metallic. The pressure pickup itself has no seals of organic materials. Only a single seal, namely the process seal, is required, and this can be replaced at any time.

Metal is especially appreciated in the foods industry, since metal is easy to clean. It is also advantageous in the foods industry, for reasons of hygiene, when as few seals of organic materials as possible are required, and any that are there can be changed-out at any time.

Naturally, the pressure sensors of the invention can be applied in other ways than as illustrated in FIG. 3. They can e.g. simply be clamped in a housing in such a way that the pressure-sensitive element is directly accessible from the outside.

Figure 4:
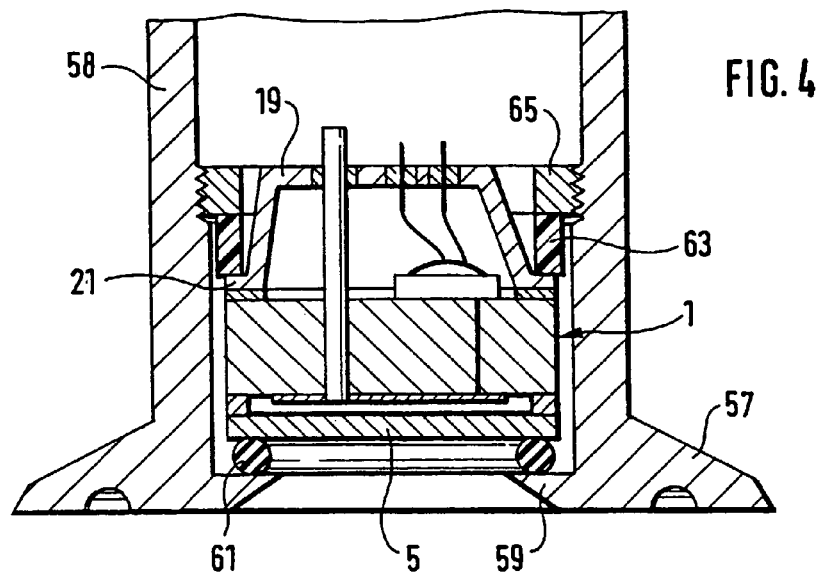
FIG. 4 shows a cross section through a housing having a process connection, in which housing the pressure measuring cell of FIG. 1 is installed.
Figure 5:
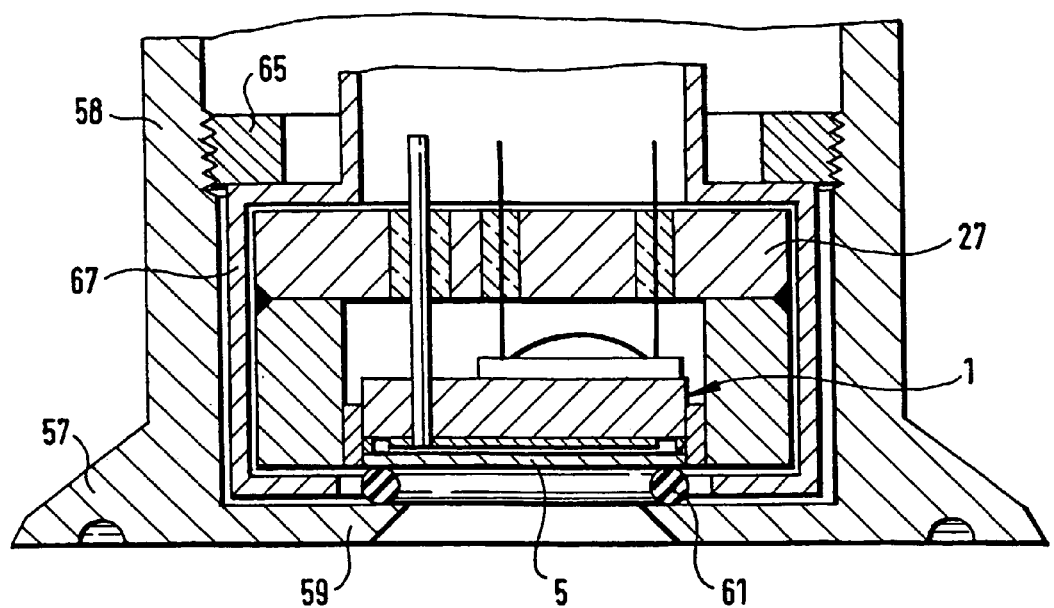
FIG. 5 shows a cross section through a housing having a process connection, in which housing the pressure measuring cell of FIG. 2 is installed.

FIGS. 4 and 5 show the pressure sensors of FIGS. 1 and 2 associated with a process connection 57 usual in the foods industry.

The pressure sensors are clamped in an essentially cylindrical housing 58, which has on the end facing the process a shoulder 59, on which the measuring membrane 5 lies with its outer, pressure-sensitive edge with interposition of a seal 61, e.g. an O-ring.

For securement at a measuring location, the housing 58 is provided with the process connection 57, which is integrated with the housing 58 and illustrated only schematically.

Process connection 57 is a standard connection, which is defined in the international standard ISO 2852. This connection is known in the measurement technology under the tradename "ridclamp". Other types of securement are also usable.

In the embodiment of FIG. 4, a ring cylinder 63 lies on the radially outwards extending edge 21 of the cap 19. A threaded ring 65 is provided, which is screwed into the housing 58 against the ring cylinder 63 from the process-far side and presses the pressure measuring cell 1 against the seal 61 and the shoulder 59. Threaded ring 65 is made e.g. of a stainless steel. The ring cylinder 63 is made preferably of a plastic and serves for protecting the cap 19 during the screwing-in of the threaded ring 65 and for neutralizing stresses that can arise because of different thermal expansions of the pressure measuring cell 1, the housing 58 and the threaded ring 65. Also, it provides an isolation of the cap 19 from the housing 58.

In the embodiment of FIG. 5, the pressure measuring cell 1 is likewise damped into the housing 58 by means of a threaded ring screwed into the housing 58.

The cap 27 is surrounded by a jacket 67. Jacket 67 surrounds a circular, disk-shaped end surface of the cap 27 facing the shoulder 59, a cylindrical, lateral surface facing the housing 58 and a circular, disk-shaped end surface of the cap 27 far from the shoulder 59. If the cap 27 is made of metal, then jacket 67 is preferably made of a plastic and effects then an insulation of the pressure measuring cell 1 from the housing 58. If the cap 27 is, in contrast, an insulator, e.g. of ceramic, then the jacket 67 is preferably of a metal and effects then an electrical screening of the pressure measuring cell 1 against external, electrical influences.

The invention claimed is:

1. A pressure sensor, having:
a measuring cell, said measuring cell comprising a pressure sensitive element arranged on a front side of said measuring cell, on which pressure sensitive element a pressure (p) to be measured acts during operation, and an electromechanical transducer for converting a reaction of said pressure sensitive element into an electrical signal;
a sensor electronics for receiving said electrical signal from said electromechanical transducer and for converting said electrical signal into a measured, electrical variable, said sensor electronics being arranged at a rear side of the measuring cell, and
a cap connected with said measuring cell, which encloses said sensor electronics, and which exhibits at least one bushing, through which pass connection lines connected to said sensor; and
a connection housing having a forwarding electronics arranged therein, wherein:
the pressure sensor is coupled to said connection housing, said forwarding electronics being provided to further process the measured variables made available by said sensor electronics through said connection lines.

2. The pressure sensor as claimed in claim 1, wherein:
a bushing for a tube is provided in said cap; and
a reference pressure ($P_R$), to which the pressure to be measured is to be referenced, is brought to said measuring cell through said tube during operation.

3. The pressure sensor as claimed in claim 1, wherein:
said cap is secured with its open end on an outer edge of the rear side of said measuring cell.

4. The pressure sensor as claimed in claim 1, wherein:
said cap is inverted over said measuring cell and connected at its open end with a closed surface portion of a lateral surface leading from the front side to the rear side of said measuring cell.

5. The pressure sensor as claimed in claim 1, wherein:
said measuring cell comprises ceramic, said cap comprises metal, and said measuring cell and said cap are hermetically sealed together by means of a seam.

6. The pressure sensor as claimed in claim 5, wherein:
said measuring cell comprises aluminum oxide, said cap comprises a nickel-iron-cobalt alloy, and said seam comprises an active braze, or hard solder.

7. The pressure sensor as claimed in claim 1, wherein:
said measuring cell comprises ceramic, said cap comprises ceramic, and said measuring cell and said cap are hermetically sealed together by means of a seal of active braze, or hard solder.

8. The pressure sensor as claimed in claim 1, wherein:
said sensor electronics is arranged directly on the rear side of said pressure measuring cell.

9. The pressure sensor as claimed in claim 1, wherein:
said sensor electronics is mounted spaced from the rear side of said pressure measuring cell.

* * * * *